United States Patent Office 3,748,308
Patented July 24, 1973

3,748,308
POLYESTERS WITH POLYCARBOXY TERMINAL GROUPS
Thomas A. Ashe, Wilmington, Del., assignor to E. I. du Pont de Nemours and Company, Wilmington, Del.
No Drawing. Continuation-in-part of abandoned application Ser. No. 776,749, Nov. 18, 1968. This application Mar. 3, 1971, Ser. No. 120,771
Int. Cl. C08g 17/14
U.S. Cl. 260—78.3 R          5 Claims

ABSTRACT OF THE DISCLOSURE

The polymers of this invention are made by first preparing a hydroxyl terminated polyester and then reacting this polyester with an anhydride. The polymers are useful as film-formers in coating compositions.

CROSS-REFERENCE TO RELATED APPLICATIONS

This application is a continuation-in-part of application Ser. No. 776,749, filed Nov. 18, 1968, now abandoned.

STATEMENT OF THE INVENTION

This invention relates to polyesters. It is more particularly directed to polyesters represented by the structure (1)

[structure with benzene ring bearing $R_1, R_2, R_3, R_4, R_5$ and $-C(=O)-B$]

where $R_1, R_2, R_3$ and $R_4$ can be hydrogen or —COOH (provided at least one of $R_1, R_2, R_3$ or $R_4$ is —COOH);
$R_5$ can be $R_6$OOC— or

[structure: $R_6O-C(=O)$—aryl—Z—, with HOOC— on aryl]

where $R_6$ can be hydrogen, $$-\overset{H}{\underset{(CH_2)_5}{\underset{|}{\overset{|}{C}}}}-(CH_2)_{10}COOH$$
$$|$$
$$CH_3$$

, —CH$_2$COOH, —CH$_3$, —C$\overset{CH_3}{\underset{CH_3}{\diagdown}}\hspace{-2pt}$H, $-(CH_2)_{11}-CH_3$, phenyl, tolyl, chlorophenyl, $-CH_2CH_2N\overset{CH_2CH_2OH}{\underset{CH_2CH_2OH}{\diagdown}}$, —CH$_2$CH$_2$SCH$_2$CH$_3$, —CH$_2$CH$_2$CH$_2$COOH, $-\overset{CH_3}{\underset{CH_3}{\overset{|}{\underset{|}{C}}}}-COOH$, $-\overset{H}{\underset{\text{phenyl}}{\overset{|}{C}}}-CH_2COOH$, $-C\overset{CH_3}{\underset{COOH}{\diagdown}}-COOH$, $-\overset{OH}{\underset{H}{\overset{|}{\underset{|}{C}}}}-\overset{H}{\underset{COOH}{\overset{|}{C}}}-COOH$, $-CH_2\diagdown N-CH_2CH_2N\overset{CH_2COOH}{\underset{CH_2COOH}{\diagdown}}$, —⟨phenyl⟩—COOH,
HOOCCH$_2\diagup$ —⟨phenyl⟩—CH$_2$COOH, —⟨phenyl⟩—CH=CHCOOH, or

[structure: HOOC—C, fused thiadiazole ring]

$-CH_2-\left[\overset{OH}{\underset{H}{\overset{|}{\underset{|}{C}}}}\right]_4-COOH$ and, Z can be $-\overset{O}{\overset{||}{C}}-$, —CH$_2$—, —S—, —SO$_2$— or —O— and, B can be $-\left[-O-X-\overset{O}{\overset{||}{C}}-\right]_n-OD$ or $-\left[-O-Y-O-\overset{O}{\overset{||}{C}}-X-\overset{O}{\overset{||}{C}}-\right]_n-OD$ where X and Y can be phenylene or alkylene radicals of 2 through 18 carbon atoms;
D can be a phenyl or straight- or branched chain alkyl radical of 1 through 18 carbon atoms; and
$n$ is a number 10 through 500.

UTILITY

The polymers of the invention are useful as film formers in coating compositions particularly when combined with a second polymer having complementary reactive groups. Illustrative of such second polymers are heat reactive phenolics, polyglycidyl ethers and esters, polyisocyanate resins, butylated urea/formaldehyde resins and melamine/formaldehyde/alkanol resins.

The polymers of the invention can be used as film-formers by mixing from about 55 to about 95 parts of the polymer with from about 5 to 45 parts of the second complementary polymer, in a suitable solvent. This solution can then be used directly to give clear coatings or it may be pigmented as desired.

The coating composition can be applied conventionally and preferably is then baked for from about 10 to 30 minutes at 80–200° C.

The polymers of the invention are also useful as aids for dispersing solid particles in organic liquids. They are especially useful as aids for dispersing pigments in organic liquids. Illustrative of the pigments which can be dispersed are titanium dioxide, carbon black, zinc oxide, lead titanate, potassium titanate, antimony oxide, lithopone, phthalocyanine blue, toluidine red, quinacridone and the like.

Pigment dispersions made with polymers of the invention are remarkably resistant to flocculation, which gives the paints into which the dispersions are incorporated higher initial gloss, better hiding and tinting strength, and makes them resistant to color drift and gloss loss. These pigment dispersions can also be used satisfactorily with many more diverse types of paints than conventional pigment dispersions. Moreover, a dispersion made with a polymer of the invention can have a significantly higher pigment content, while retaining the same degree of fluidity, than when conventional aids are used.

The polymers of the invention can be used as pigment dispersing aids by dissolving from 0.001 to about 2.00 grams of polymer per square meter [1] of surface of

[1] Measured by the Brunauer, Emmett and Teller nitrogen adsorption method described on page 30 of "Colloidal Dispersions," by Earl K. Fischer, published by John Wiley and Sons in 1950.

the pigment to be used, preferably 0.004 to about 0.100 gram per square meter, in an organic liquid compatible with the paint into which the pigment dispersion is to be incorporated. Illustrative of organic liquids which can be used are aliphatic and aromatic hydrocarbons, ethers, esters, ketones, alcohols, and mixtures of these.

An appropriate amount of pigment is then added to this solution, which is then subjected to shear, as by sand-grinding or ball-milling, to deagglomerate and disperse the pigment. This pigment dispersion or mill-base can be then added directly to a paint.

Polymers of the invention preferred for use as pigment dispersing aids are those of Formula 1 where D is a straight- or branched chain alkyl radical of 3 through 12 carbon atoms. Especially preferred are those whose preparation is shown in Examples 2, 4 and 8.

The polymers of the invention are also useful for dispersing magnetic oxides such as iron oxide or chromium dioxide in compositions used to prepare magnetic tape. Use of 0.5–10%, by weight of such a composition, of a polymer of the invention promotes wetting of the oxide, improves adhesion of the composition to the tape substrate and improves the tape's magnetic properties.

PREPARATION OF THE POLYMERS

The polymers of this invention are made by first preparing a hydroxyl terminated polyester and then reacting this polyester with an anhydride.

Hydroxyl terminated polyesters can be made by (1) Polymerizing lactones such as propiolactone, caprolactone and pivalolactone.

(2) Condensing a glycol and a dibasic acid in the presence of a mono-alcohol. The formation of polyesters capped at both ends with hydroxyl groups should be minimized. This can be done by controlling the stoichiometry of the reaction so that the acid number and the hydroxyl number of the polyester are approximately equal.

(3) Condensing a hydroxy acid in the presence of a small amount of mono-alcohol.

Illustrative of these reactions are:

(1)

$$26H_2C \underset{O}{\overset{\diagup CH_2 \diagdown}{\diagdown \diagup}} C=O + CH_3-(-CH_2)_3OH \longrightarrow$$

$$H\left[O(CH_2)_5\overset{O}{\overset{\|}{C}}\right]_{26}O(CH_2)_2CH_3$$

(2)

$$CH_3(CH_2)_5OH + 30HOCH_2CH_2OH + 30HO\overset{O}{\overset{\|}{C}}(CH_2)_{10}\overset{O}{\overset{\|}{C}}OH \xrightarrow{H^+}$$

$$H\left[O(CH_2)_2O\overset{O}{\overset{\|}{C}}(CH_2)_{10}\overset{O}{\overset{\|}{C}}\right]_{30}O(CH_2)_5CH_3 + 60H_2O$$

(3)

$$\langle\!\!\!\bigcirc\!\!\!\rangle CH_2OH + 20HO-CH-(CH_2)_{10}-COOH \xrightarrow{H^+}$$
$$\qquad\qquad\qquad\qquad |$$
$$\qquad\qquad\qquad (CH_2)_5$$
$$\qquad\qquad\qquad\qquad |$$
$$\qquad\qquad\qquad CH_3$$

$$H\left[OCH(CH_2)_{10}-\overset{O}{\overset{\|}{C}}\right]_{20}OCH_2\langle\!\!\!\bigcirc\!\!\!\rangle + 20H_2O$$
$$\quad\;|$$
$$(CH_2)_5$$
$$\quad\;|$$
$$CH_3$$

These reactions are described in greater detail in "Preparative Methods of Polymer Chemistry," Sorenson and Campbell, Interscience Publishers, Inc., New York, N.Y. (1961), pp. 111–127 and 242–247 and "Polyesters and Their Applications," Bjorksten Research Laboratories, Inc., Reinhold Publishing Corp., New York, N.Y. (1956).

The resulting polyester is then reacted with a stoichiometric amount of an anhydride to produce a polymer of the invention. Illustrative of the anhydrides which can be used are trimellitic anhydride
benzophenone dianhydride
methylene diphthalic anhydride
thiophthalic dianhydride
oxyphthalic dianhydride
pyromellitic dianhydride The reaction is ordinarily run in a solvent such as methylethyl ketone, Cellosolve acetate or ethylene glycol dimethyl ether, at a temperature of from 50° C. to about 150° C.

When a dianhydride is used, a stoichiometric amount of water can be added and the mixture heated to convert the anhydride moiety to carboxyl groups.

If an $R_6$ moiety is attached to the molecule, a stoichiometric amount of an appropriate hydroxy acid can be added and the reaction mass heated for 3 hours at 80° C.

The product can be isolated from the reaction mass by heating the mass at 100° C. and 20 mm. of pressure for about 1 hour to eliminate solvent.

The physical properties of the polymers of the invention thus prepared range from viscous liquid to friable solid. They are soluble in polar solvents such as toluene, ethyl acetate, tetrahydrofuran, acetone, cyclohexane and dimethylformamide.

EXAMPLES

The following examples are submitted so that the invention may be more readily understood and practiced.

Those skilled in the art will no doubt be able to compose numerous variations on their central theme, such as the attachment of innocuous substituents. It is naturally considered that those variations are a part of the invention.

In the examples all parts are by weight unless otherwise indicated.

Example 1

A mixture of 296 parts of hydroxy terminated poly caprolactone (molecular weight 2969)*, 19.2 parts of trimellitic anhydride, and 700 parts of methylethyl ketone was heated for four hours at 80° C. under nitrogen.

The product, isolated by stripping the reaction mixture at 100° C. and at a pressure of 20 mm., was a waxy solid having the structure $$HOOC-\langle\!\!\!\bigcirc\!\!\!\rangle\overset{\displaystyle \overset{O}{\overset{\|}{-C-}}}{\underset{\displaystyle -COOH}{}}\left[O(CH_2)_5\overset{O}{\overset{\|}{C}}\right]_{\sim 26}O(CH_2)_3CH_3$$

with a small amount of isomers present.

Example 2

Ninety-three and three-tenths parts of hydroxy-terminated polycaprolactone (molecular weight 2960), 200 parts of methylethyl ketone and 10.7 parts of benzophenone dianhydride were mixed and heated under nitrogen for four hours at 80° C.

The mixture was cooled to room temperature, 12 parts of technical grade 12-hydroxystearic acid and 0.1 part of dibutyl tin dilaurate were added and the mixture heated for three more hours under nitrogen at 80° C.

The product, a waxy solid, was recovered by removing the methylethyl ketone by heating at 100° C. at a pressure of 20 mm. Its structure was

---

*Sold by Union Carbide Co.

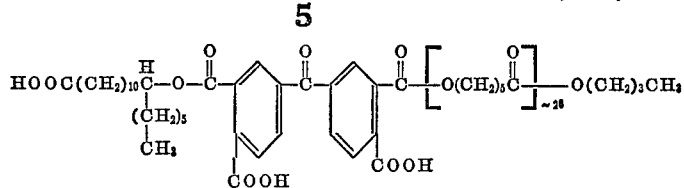

with a small amount of isomers present.

Example 3

The procedure of Example 2 was repeated using 0.252 part of hydroxyacetic acid in place of the 12-hydroxystearic acid. The resulting polymer had the structure

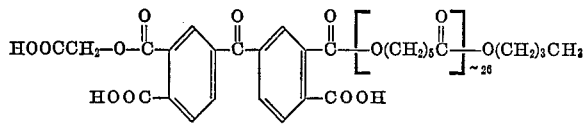

Example 4

Fifty-nine and two-tenths parts of hydroxy terminated polycaprolactone (molecular weight 2960) were dissolved in 250 parts of anhydrous Cellosolve acetate at 100° C. This solution was added to a slurry of 6.4 parts of benzophenone dianhydride in 200 parts of Cellosolve acetate and the mixture heated for two hours at 80–100° C.

Four-tenths parts of water was added and the mixture heated for another hour at 80° C.

The solvent was then removed by stripping at 100° C. and 20 mm. of pressure to give a waxy white solid having the structure

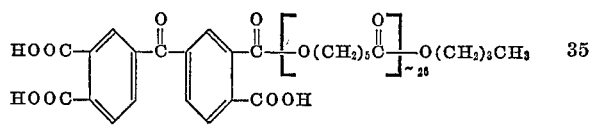

Example 5

The procedure of Example 4 was repeated, using 6.16 parts of methylene diphthalic anhydride in place of the benzophenone dianhydride.

The resulting polymer had the structure

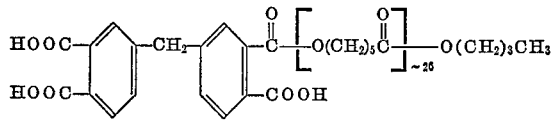

Example 6

The procedure of Example 4 was repeated, using 6.52 parts of thiodiphthalic dianhydride in place of the benzophenone dianhydride.

The resulting polymer had the structure

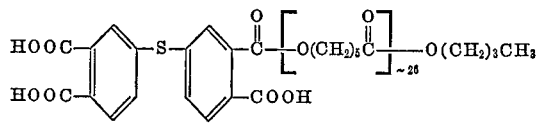

Example 7

One hundred fifty parts of 12-hydroxystearic acid, 6 parts of 2-ethylhexyl alcohol, 10 parts of xylene and 1 part of p-toluene sulfonic acid were charged to a reactor. The reaction mixture was heated at reflux temperature and xylene distilled off until the flask contents reached 175° C. The mixture was refluxed at 175° C. for 8 hours, with water being removed as it formed.

The mixture was then cooled to about 100° C. and 150 parts of ethylene glycol dimethyl ether and 9.7 parts of pyromellitic dianhydride were added. After heating the mixture for six hours at a temperature of 100° C. the product was freed of solvent by heating at 100° C. and 20 mm. of pressure for one hour.

The product was a sticky resinous material having the structure

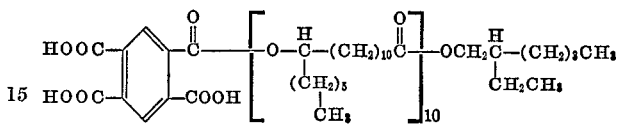

What is claimed is:

1. A mixture of isomers of a polymeric material of the formula

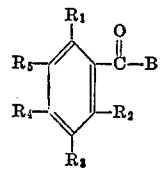

where $R_1$ and $R_2$ are hydrogen of —COOH (provided at least one of $R_1$, $R_2$, $R_3$ or $R_4$ is —COOH);
$R_5$ is $R_6$OOC— or

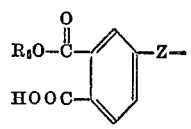

where $R_6$ is hydrogen,

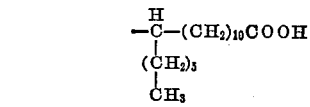

—CH$_2$COOH

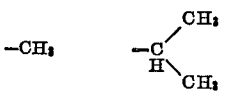

—CH$_3$ 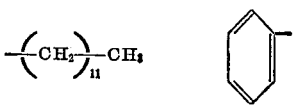

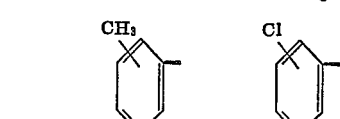

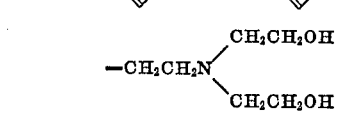

—CH$_2$CH$_2$N(CH$_2$CH$_2$OH)(CH$_2$CH$_2$OH)

—CH$_2$CH$_2$SCH$_2$CH$_3$
—CH$_2$CH$_2$CH$_2$COOH

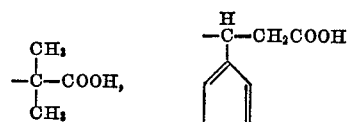

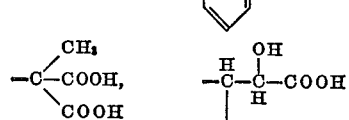

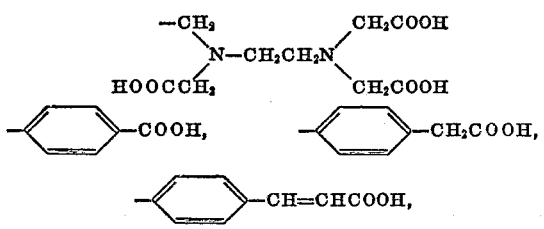

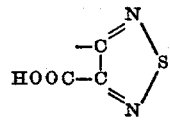

or

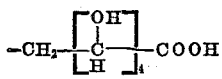

and, Z is

—CH$_2$—, —S—, —SO$_2$— or —O—; and, B is

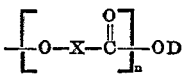

or

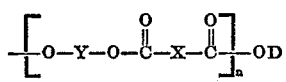

where

X and Y are alkylene radicals of 2 through 18 carbon atoms;

D is a phenyl or straight- or branched chain alkyl radical of 1 through 18 carbon atoms; and n is a number 10 through 500.

2. The polymeric material of claim 1 where D is a straight or branched chain alkyl radical of 3 through 12 carbon atoms and n is a number 10 through 200.

3. The polymeric material of claim 1 having the formula

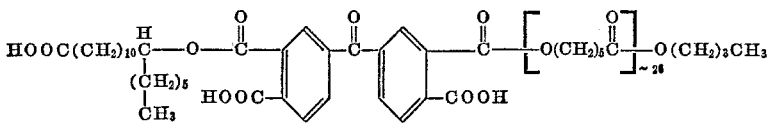

4. The polymeric material of claim 1 having the formula

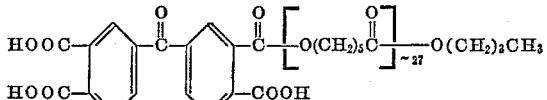

5. A polymeric material having the formula

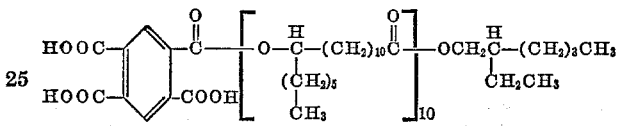

References Cited
UNITED STATES PATENTS

| | | | |
|---|---|---|---|
| 2,977,385 | 3/1961 | Fowler et al. | 260—475 |
| 3,055,869 | 9/1962 | Wilson et al. | 260—75 |
| 3,169,945 | 2/1965 | Hostettler et al. | 260—78.3 |

WILLIAM H. SHORT, Primary Examiner

E. A. NIELSEN, Assistant Examiner

U.S. Cl. X.R.

106—308; 260—29.6 NR, 75 T, 77, 475 R, 475 P, 830 R, 838